United States Patent
Sicola et al.

(10) Patent No.: US 6,988,136 B2
(45) Date of Patent: *Jan. 17, 2006

(54) UNIFIED MANAGEMENT SYSTEM AND METHOD FOR MULTI-CABINET DATA STORAGE COMPLEXES

(75) Inventors: Stephen J. Sicola, Palmer Lake, CO (US); Bruce Sardeson, Colorado Springs, CO (US); Dennis Spicher, Monument, CO (US); Bruce Roberts, Colorado Springs, CO (US); Bill Pagano, Colorado Springs, CO (US); Richard Lary, Colorado Springs, CO (US); William K. Miller, Colorado Springs, CO (US); Mark J. Conrad, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 767 days.

This patent is subject to a terminal disclaimer.

(21) Appl. No.: 10/000,190

(22) Filed: Oct. 19, 2001

(65) Prior Publication Data

US 2003/0079082 A1    Apr. 24, 2003

(51) Int. Cl.
*G06F 15/173*    (2006.01)
(52) U.S. Cl. .................. 709/224; 709/225; 709/226; 711/112; 711/114; 710/100; 710/305
(58) Field of Classification Search ........ 709/224–226; 711/112, 114; 710/100, 305
See application file for complete search history.

(56) References Cited

U.S. PATENT DOCUMENTS

| | | |
|---|---|---|
| 5,109,318 A | 4/1992 | Funari et al. |
| 5,184,281 A | 2/1993 | Samarov et al. |
| 5,513,314 A | 4/1996 | Kandasamy et al. |
| 5,815,371 A | 9/1998 | Jeffries et al. |
| 5,815,649 A | 9/1998 | Utter et al. |
| 5,822,777 A | 10/1998 | Leshem et al. |
| 5,832,222 A | 11/1998 | Dziadosz et al. |
| 5,835,700 A | 11/1998 | Carbonneau et al. |
| 5,838,891 A * | 11/1998 | Mizuno et al. ................. 714/5 |
| 5,892,973 A * | 4/1999 | Martinez et al. .............. 710/15 |
| 5,938,776 A * | 8/1999 | Sicola et al. ................... 714/25 |
| 5,956,665 A * | 9/1999 | Martinez et al. ............ 702/188 |
| 5,987,622 A | 11/1999 | Lo Verso et al. |
| 5,996,089 A | 11/1999 | Mann et al. |
| 6,038,689 A | 3/2000 | Schmidt et al. |

(Continued)

OTHER PUBLICATIONS

Smart Storage Inc., "SmartStor InfiNet™: Virtual Storage for Today's E-economy," Sep. 2000.

(Continued)

*Primary Examiner*—Ario Etienne
*Assistant Examiner*—LaShonda Jacobs

(57) ABSTRACT

A multi-cabinet mass storage system with unified management features. The system includes a first reporting group and a second reporting group each having enclosure with processors, such as an environmental monitoring units (EMUs), for generating and transmitting environmental messages pertaining to the particular enclosures. The enclosures are positioned on shelves within cabinets. A bus or cabinet cable links each enclosure to facilitate broadcasting the environmental messages. The environmental messages identify the sending device's reporting group and its physical location within the system. Additional enclosures are included in this reporting group with enclosures of each reporting group located all in one cabinet, in two or more cabinets, and each cabinet may house one, two, or more reporting groups. A network links all of the cabinets to concurrently broadcast the environmental messages throughout the system and allows enclosures in a single reporting group to be positioned in differing cabinets.

30 Claims, 7 Drawing Sheets

U.S. PATENT DOCUMENTS

| | | | |
|---|---|---|---|
| 6,073,209 | A | 6/2000 | Bergsten |
| 6,148,414 | A | 11/2000 | Brown et al. |
| 6,188,973 | B1 * | 2/2001 | Martinez et al. ............ 702/188 |
| 6,237,112 | B1 | 5/2001 | Yoo et al. |
| 6,243,790 | B1 | 6/2001 | Yorimitsu |
| 6,260,120 | B1 | 7/2001 | Blumenau et al. |
| 6,266,721 | B1 | 7/2001 | Sheikh et al. |
| 6,278,609 | B1 | 8/2001 | Suzuki et al. |
| 6,282,094 | B1 | 8/2001 | Lo et al. |
| 6,282,096 | B1 | 8/2001 | Lo et al. |
| 6,282,610 | B1 | 8/2001 | Bergsten |
| 2002/0010883 | A1 * | 1/2002 | Coffey et al. ............... 714/712 |
| 2002/0133736 | A1 * | 9/2002 | Faber et al. .................. 714/5 |

OTHER PUBLICATIONS

Compaq Computer Corporation, "The Compaq Enterprise Network Storage Architecture: An Overview," May 2000.

Compaq Computer Corporation, "Compaq Storage Works" Data Replication Manager HSG80 ACS V8.5P Operations Guide, Mar. 2000.

* cited by examiner

| SHELF ID | BITS 7..4 | BITS 3..1 | BIT 0 |
|---|---|---|---|
| 1 | 1110 | 110 | 0 |
| 2 | 1110 | 110 | 1 |
| 3 | 1101 | 101 | 0 |
| 4 | 1101 | 101 | 1 |
| 5 | 1011 | 011 | 0 |
| 6 | 1011 | 011 | 1 |
| 7 | 0111 | 110 | 0 |
| 8 | 0111 | 110 | 1 |
| 9 | 1110 | 101 | 0 |
| 10 | 1110 | 101 | 1 |
| 11 | 1101 | 011 | 0 |
| 12 | 1101 | 011 | 1 |
| 13 | 1011 | 110 | 0 |
| 14 | 1011 | 110 | 1 |
| 15 | 0111 | 101 | 0 |
| 16 | 0111 | 101 | 1 |
| 17 | 1110 | 011 | 0 |
| 18 | 1110 | 011 | 1 |
| 19 | 1101 | 110 | 0 |
| 20 | 1101 | 110 | 1 |
| 21 | 1011 | 101 | 0 |
| 22 | 1011 | 101 | 1 |
| 23 | 0111 | 011 | 0 |
| 24 | 0111 | 011 | 1 |
| CABINET CABLE DISCONNECTED | 1111 | XXX | X |
| CABINET CABLE DISCONNECTED | XXXX | 111 | X |

FIG.4

UNIFIED MANAGEMENT SYSTEM AND METHOD FOR MULTI-CABINET DATA STORAGE COMPLEXES

BACKGROUND OF THE INVENTION

1. Field of the Invention

The present invention relates, in general, to computer systems and mass data storage systems and subsystems, and more particularly, to a system and method for grouping and communicatively-linking devices within a multi-cabinet mass storage system to enable device monitoring and control of all or most of the devices in the system from a single GUI host or control device.

2. Relevant Background

In the computer industry, there is ongoing and increasing demand for data storage systems with more capacity as well as improved reliability. The use of RAID (Redundant Arrays of Inexpensive Disks) systems has significantly enhanced data storage reliability by providing redundancy, i.e., failure of one system component does not cause loss of data or failure of the entire system. Although initially RAID systems generally provided redundant disk drives, more functional redundancy has recently been provided by extending redundancy to device enclosures. These enclosures may include a number of components such as power supplies, cooling modules, disk devices, temperature sensors, audible and/or visible alarms, and RAID and other controllers. To provide functional redundancy, the enclosure typically includes an extra one of each of these components that is needed for proper functionality. For example, two power supply units may be provided such that if one fails the remaining power supply unit is capable of providing adequate power.

Providing monitoring and control over the devices and enclosures within each cabinet in the storage system complex has proven to be a difficult problem for the data storage industry. Mass storage systems typically include numerous multi-shelf cabinets or racks each holding multiple enclosures. The systems are adapted for replacement of individual enclosures to upgrade or modify the system or in some cases, to service an enclosure but a system of collecting status information and controlling operation of each device is required to manage the systems. Often, control devices such as array controllers are used to control the transfer of environmental data from the devices and to issue control commands to the devices, and a management tool such as a host computer with or without a graphical user interface (GUI) is provided to allow a system operator to manage device operations through the array controllers.

This arrangement has increased mass storage system complexity and cost by requiring a separate management tool or device for every array controller. Providing uniform control over the system devices is difficult with this common arrangement because accessing all the devices required operating all of the management devices and/or communicating with all of the array controllers even when the array controllers are physically located within the same cabinet. Additionally, it is difficult to allow sharing of resources between cabinets as each cabinet is typically serviced by different array controllers and/or management devices.

Hence, there remains a need for an improved method and system for accessing information from and controlling operation of devices, such as enclosures and components within the enclosures, within a multi-cabinet mass storage system or complex. Preferably, such a method and system would support the presentation of uniform information and error messages simultaneously across all cabinets within the system, would enable monitoring and controlling of all or most of the devices in the system from a single device or by a single entity, and would have device and subsystem isolation and monitoring capabilities but would not detrimentally effect controller performance or create a single failure point (i.e., retain redundancy of system).

SUMMARY OF THE INVENTION

The present invention addresses the above discussed and additional problems by providing a management system and method for use in a mass storage complex having a number of multi-shelf cabinets. The management system and method allows arrays of disk drives or enclosure devices to span multiple cabinets, minimizes the single points of failure, and enables a single device or controller to be able to obtain environmental data by addressing any drive on a communication link (e.g., a fibre channel loop) while, at least in some embodiments, fully satisfying the SCSI Enclosure Services (SES) specifications (such as the sub-enclosure reporting specifications).

More particularly, a mass storage system is provided having the unified management features of the invention. The system includes a first reporting group and a second reporting group each having an enclosure processor, such as an environmental monitoring unit (EMU), for generating and transmitting environmental messages pertaining to the particular enclosure. The system further includes a bus linked to each of the enclosures for broadcasting or transmitting the environmental messages. In one embodiment, the enclosures are positioned on shelves within one or more cabinets and the bus is a cabinet cable contained within each cabinet. Typically, the environmental messages include information identifying which reporting group the sender belongs to and the physical location of the sending device within the system (e.g., cabinet identification and shelf position within the identified cabinet).

The system may be arranged with additional enclosures included in each reporting group and the enclosures of each reporting group may be located all in one cabinet, in two or more cabinets, and each cabinet may house one, two, or more reporting groups. Each cabinet in the system is preferably linked by a cabinet communication network that allows substantially concurrent broadcast of the environmental messages throughout the system and allows enclosures in a single reporting group to be positioned in differing cabinets. Each cabinet typically includes a cabinet processor or EMU positioned between the cabinet bus and cabinet communication network to broadcast messages originating within the cabinet over the network and to receive the messages on the network. The cabinet processor may act as a firewall by only transmitting messages pertaining to reporting groups housed in its cabinet to the cabinet bus.

Each of the enclosures in a single reporting group is preferably linked with a separate data loop, such as a fibre channel loop. A host device or management tool is linked to the data loop to monitor operation of the enclosures within the reporting group and to issue command sets to the enclosures within the reporting group. In each reporting group, one enclosure is designated as the primary reporting device and is responsible for receiving command sets for the reporting group (and redistributing the command sets as appropriate) and for reporting environmental information collected for the entire reporting group from the cabinet bus. To allow any enclosure to be the primary reporting device, each of the enclosure processors are adapted to identify which messages on the cabinet bus pertain to their reporting group and to collect and store at least portions of this information in the enclosure memory. With this arrangement, the enclosure devices can be reassigned to different reporting groups and the primary reporting device can be changed as needed to efficiently use the resources of the system.

BRIEF DESCRIPTION OF THE DRAWINGS

FIG. 4 is a table illustrating shelf identifiers obtained using an eight-wire arrangement in a cabinet cable;

DETAILED DESCRIPTION OF THE PREFERRED EMBODIMENTS

The present invention is directed toward a unified or centralized management system and method for use in multi-cabinet or rack data storage complexes. The management system is unique at least for allowing data, data devices, and other support devices (such as heat and cooling portions of device enclosures) to be controlled and monitored from a single device or management tool. Generally, the management system includes a cabinet communication network that facilitates broadcasting of messages amongst devices and/or enclosures on shelves of cabinets and amongst the cabinets. These messages can be broadcast simultaneously to all cabinets and cabinet devices over the cabinet communication network to allow uniform information gathering, error reporting, and control of device operation. The communication network preferably does not require connection to the data and control links to the devices, e.g., the fibre channel loops between hosts and array controllers, to allow out-of-band communication.

The management system also provides for a unique configuration of the device enclosures and controllers into reporting groups with enclosures and their included processors (e.g., environmental monitoring units (EMUs)) acting as primary and secondary reporting devices to the connected host computer or device. The reporting group feature of the management system when combined with the cabinet communication network and system-wide messaging allows device enclosures and controllers to be located in one or more cabinet, which facilitates efficient usage of the data storage complex and enhances service and installation of devices within the complex with minimal disruption of operations. The management system utilizes physical location information for each device enclosure including the physical shelf location and cabinet identifier within each broadcast message to further system management by allowing system mapping and enhancing proper assignment of devices to reporting groups. Hence, the following discussion will begin with a discussion of a data storage system that provides one method of sensing or determining the cabinet and shelf of each device enclosure. This initial discussion also provides a description of one preferred arrangement for a device enclosure with an EMU that can be used in processing and broadcasting messages within the management system. Clearly, the management system of the invention may be utilized with different position sensing systems (e.g., nearly any technique may be used to provide the shelf and cabinet information to the EMU of the enclosure) and with numerous other computing devices placed in cabinets and enclosure arrangements.

Figure 1:
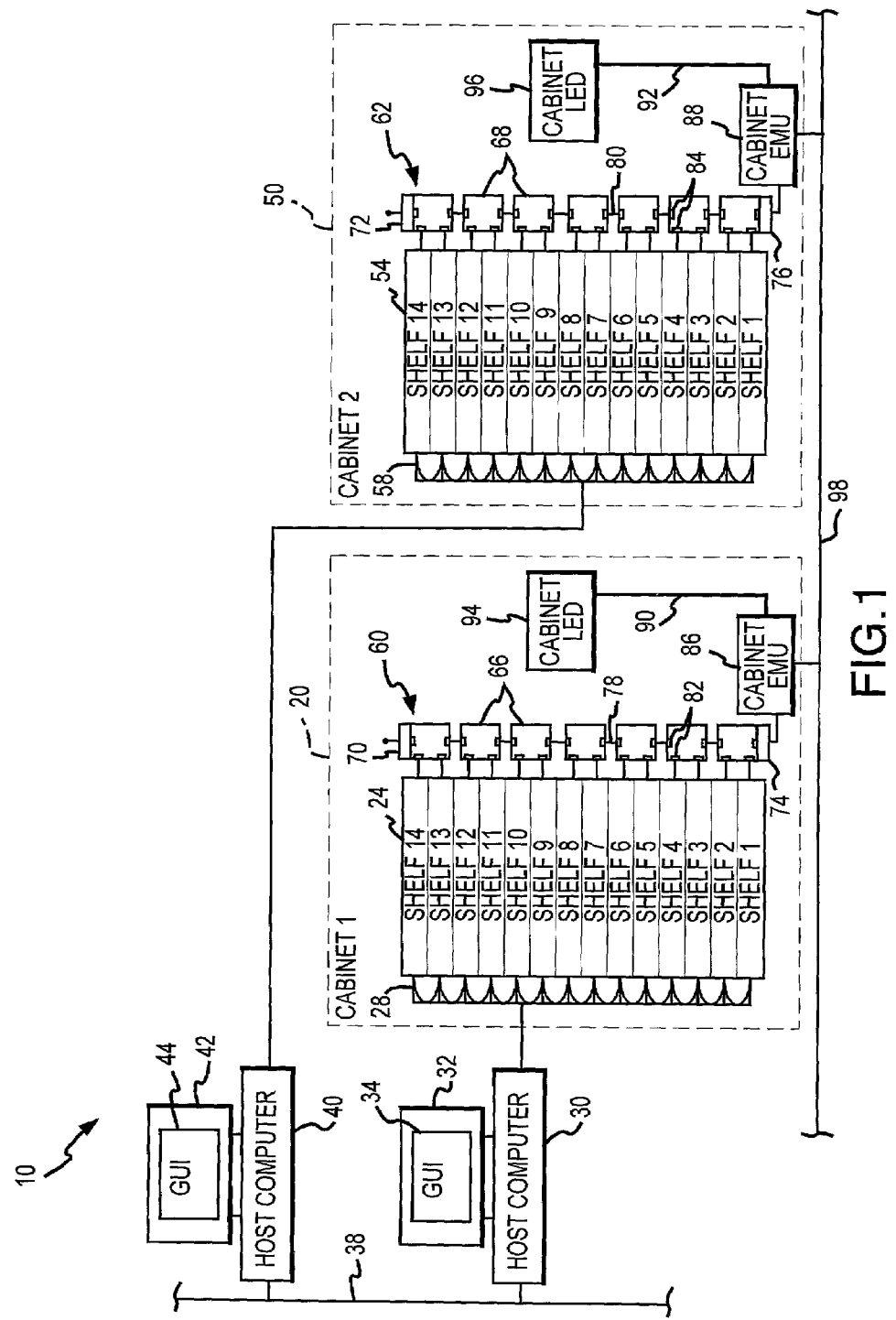
FIG. 1 is an illustration of a data storage system or complex with cabinets having multiple shelves incorporating a cabinet cable that provides position detection useful with the unified management system of the present invention.

FIG. 1 illustrates a data storage system 10 that provides components that function in combination to provide one technique of providing enclosure position sensing. As shown, the data storage system 10 has a first and second cabinet 20, 50 (although typical systems 10 may have many more cabinets 20, 50) each having a plurality of shelves 24, 54. The shelves 24, 54 or shelf locations are configured to allow an enclosure (such as the device enclosure 100 of FIG. 2) or other components to be plugged into and supported within the cabinet 20, 50. Typical cabinet 20, 50 configurations call for 14 shelves 24, 54 although more shelves may be provided, such as up to 24 or more shelves 24, 54. If shelves 24, 54 are arranged vertically, a typical cabinet 20, 50 may have 24 shelves 24, 54 that each occupy a certain amount of rack space, such as 3 retma (U) (a standard mounting unit increment).

Each shelf 24, 54 (and more particularly, the enclosure 100 at a shelf location 24, 54) is linked to a fibre channel loop 28, 58 or other data link that enables access by and data flow to a host computer 30, 40. The data that is passed typically includes SCSI-3 Enclosure Services (SES) data and command sets and importantly, includes position information that identifies the shelf position and cabinet number or other identifier. The host computer 30, 40 may be a personal computer (PC), a server, or other computer or electronic device running software for allowing a user to access the position information (i.e., to receive the position information or signals from the fibre channel loops 28, 58 and display or otherwise provide enclosure position information to the user). In one embodiment, the host computer 30, 40 includes a monitor 32, 42 and provides enclosure position information via a graphical user interface (GUI) 34, 44. The host computers 30, 40 are further linked to a communication network or bus 38, such as a company Ethernet, intranet, and the like, to allow information from enclosures on the shelves 24, 54 to be requested, retrieved, and transmitted to users at a location remote from the cabinets 20, 50.

Significantly, the cabinets 20, 50 include cabinet cables or busses 60, 62 that are configured to passively provide electrical signals to enclosures on the shelves 24, 54 that uniquely identify the position (typically vertical position) within the cabinet 20, 50. The cabinet busses 60, 62 also provide an out-of-band (external to any fibre channel loop)

communication path between the shelves 24, 54 (as will be discussed further in relation to FIGS. 5 and 6). The cabinet busses 60, 62 are divided into a number of junction boxes 66, 68. As shown, each junction box 66, 68 is linked to two shelves 24, 54. Each junction box 66, 68 includes four connectors, such as RJ-45 connectors, for connection to the shelves 24, 54 and adjacent junction boxes 66, 68 and/or terminators. The busses 60, 62 further includes a top terminator 70, 72, and a bottom terminator 74, 76. The cabinet busses 60, 62 components are explained in more detail with reference to FIG. 3 that illustrates an exemplary wiring arrangement for a portion of the bus 60.

Each cabinet 20, 50 includes a cabinet EMU 86, 88 that provides cabinet information such as a cabinet identifier, cabinet type, and the like that is passed via the cabinet busses 60, 62 to the shelves 24, 54 for use by an enclosure in sensing or determining position of the enclosure within the system 10. The cabinet information originates at the cabinet EMU 86, 88 located within the cabinet 20, 50. In multi-cabinet systems 10, the cabinet EMU 86, 88 typically also acts as a firewall and router for SES information. In this regard, the cabinet EMU 86, 88 is linked to a communication link or network 98 (such as a private Ethernet) that allows the EMU 86, 88 to broadcast SES data for all shelves or groups of shelves 24, 54 to other cabinet EMUs 86, 88. The cabinet EMU 86, 88 filters the received SES data and forwards it to the corresponding enclosures on shelves 24, 54 by group (e.g., the received SES data is rebroadcast via the cabinet bus 60, 62). The cabinet EMU 86, 88 also transmits signals to the cabinet LED display (and audio alarm) 94, 96 for displaying status information for enclosures on the shelves 24, 54.

Figure 2:
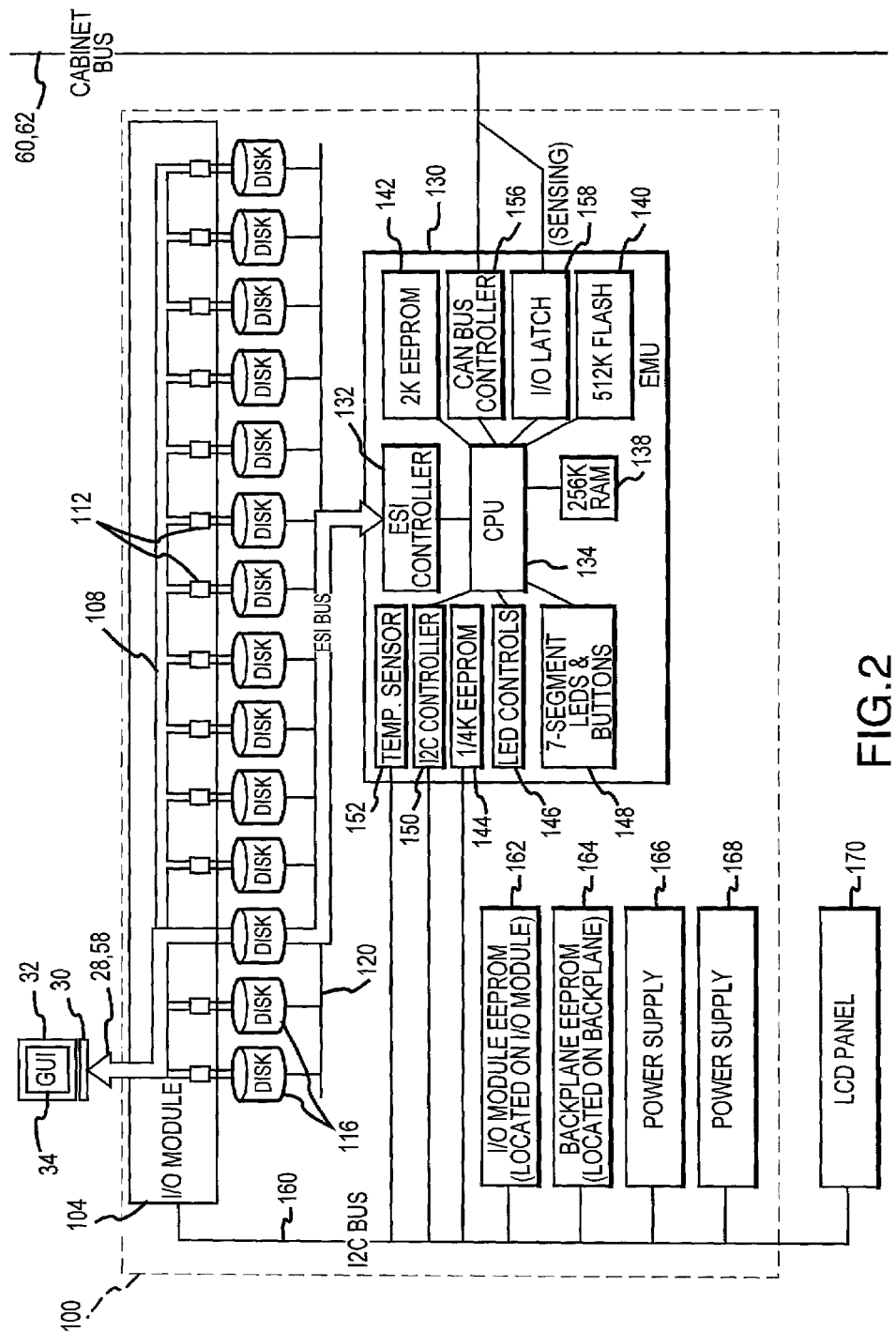
FIG. 2 is a simplified block diagram of an exemplary device enclosure that may be positioned on a shelf of the cabinets of FIG. 1.

FIG. 2 illustrates an exemplary device enclosure 100 that according to the invention is configured to receive passive position signals from the cabinet busses 60, 62, process the signals including the cabinet identifier from the cabinet EMU 86, 88 (or another component), and transmit the enclosure position information in a signal to the host computer 30 (or 40). Note, the term shelf is often used for components within a cabinet 20, 50 such as an enclosure 100. In this application, shelf and shelf position is being used to identify a location, e.g., a vertical position, within a cabinet 20, 50 at which an enclosure 100 or other component(s) is connected or plugged in to the system 10.

The GUI host 30, 40 refers generally to any controller or host adapter capable of processing enclosure position signals and displaying (or otherwise reporting) the enclosure position to a user. The host typically will also be used to communicate SES data or pages via the fibre channel loop 28, 58 to and from the cabinets 20, 50. The highlighted path from the GUI host 30, 40 is used to show one exemplary path in the enclosure 100 for such SES data. The enclosure 100 is also linked directly to the cabinet busses 60, 62 to receive the cabinet identifier and shelf position information or identifier from the bus 60, 62 (as explained below).

The enclosure 100 includes an input/output (I/O) module 104 linked to the fibre channel loop 28, 58. The fibre channel loop 28, 58 is typically an arbitrated loop and although this diagram only shows one loop 28, 58 passing to (as shown by dashed lines 108) the I/O module 104, the enclosure 100 may have two redundant loops with two I/O modules 104. The I/O module 104 acts as a communication interface to a plurality of disk devices or disk drives 116. Each I/O module 104 includes a bypass circuit 112 for each disk drive 116. The bypass circuit 112 can redirect the fibre loop 108 to include or exclude the disk drive 116 in the loop 108. If an EMU 130 is included in the enclosure 100, the EMU 130 can be used to control the bypass circuits 112 via the I/O module 104. If no EMU 130 is present, the I/O modules can be configured to control the bypass circuits 112.

A number of standard disk devices may be utilized for the disk drives 116 to practice the invention. For example, in one embodiment, the disk drives 116 are selected to conform to the "Enclosure Initiated ESI" option described in the "SFF Committee, SFF-8067 Specification for 40-pin SCA-2 Connector w/Bi-directional ESI," Rev. 2.6, Nov. 19, 1999. An Enclosure Services Interface (ESI) bus 120 is provided to facilitate position and SES data to be passed between the EMU 130 and the GUI host 30, 40. Preferably, the ESI bus 120 functions to allow the EMU 130 to provide enclosure position and SES data signals without occupying an address on the fibre channel loop 108 (although in some embodiments the EMU 130 may be directly linked to the host 30, 40).

As shown, the enclosure 100 includes an EMU 130 that primarily functions to process and broadcast SES data to the GUI host 30, 40 and/or the cabinet EMU 86, 88 (as will be discussed more with reference to FIGS. 5–7). The EMU 130 also functions to process and forward passive shelf identifier information and cabinet identifier information from the cabinet bus 60, 62. To this end, the EMU 130 includes an ESI controller 132, an EMU processor or CPU 134, and a controller area network (CAN) bus controller 156. Memory is provided for use by the CPU 134, and may take many forms such as that illustrated of RAM 138 (such as 256 K), flash memory 140 (such as 512 K), and EEPROM 142 (such as 2 K). FIG. 2 illustrates the cabinet cable or bus 60, 62 being connected to the CAN bus controller 156 and input/output registers 158 to allow the EMU 130 to obtain the shelf identifier signal. In other embodiments not shown, the EMU 130 may obtain the shelf identifier or number from other wires on the cabinet bus 60, 62 connected to other components of the EMU 130 or of the enclosure 100.

The EMU 130 further includes memory 144 in the form of ¼ K EEPROM that is typical of many printed circuit assemblies and may be used by the EMU 130 for storage of type and revision information, worldwide names, serial numbers, and similar information. LED controls 146 and an input and output display 148 are provided for operation by the EMU CPU 134. An I2C (Inter-Integrated Circuit) controller and temperature sensor 152 are provided and linked to the I2C bus 160 which provides a communication path for the EMU 130 to receive status information from and to send control information to all of the elements of the enclosure 100. The enclosure 100 further includes I/O module 104 memory 162 and backplane memory 164 linked to the I2C bus 160. Redundant power supplies 166, 168 are also provided and linked to the I2C bus 160. A LCD panel 170 for the enclosure 100 may also be provided and linked (by a RJ-45 connector or otherwise) to the I2C bus 160 for receiving control signals from the EMU 130.

The enclosure 100 passively receives electrical signals that it uses to determine a unique digital identifier for the shelf 24, 54 upon which the enclosure is positioned. This is achieved with the use of the cabinet bus 60, 62 that includes a series of junction boxes 66, 68 that each provide a unique shelf identifier for a set of shelves 24, 54 (such as for 2 shelves). The cabinet bus 60, 62 is comprised, in part, of wires that are divided into sensing sets or groups that work in combination to provide a single position signal that identifies the shelf 24, 54 (e.g., vertical position within the cabinet 20, 50). Two sensing sets are used along with alternate grounding and wire crossover between junction boxes 66, 68 to provide the passive signaling of shelf identifiers. Depending on the number of shelves 24, 54 to be identified in a cabinet 20, 50, numerous combinations of numbers of wires in each sensing set may be used such as sets of 5 and 2, 4 and 3, and the like.

Figure 3:
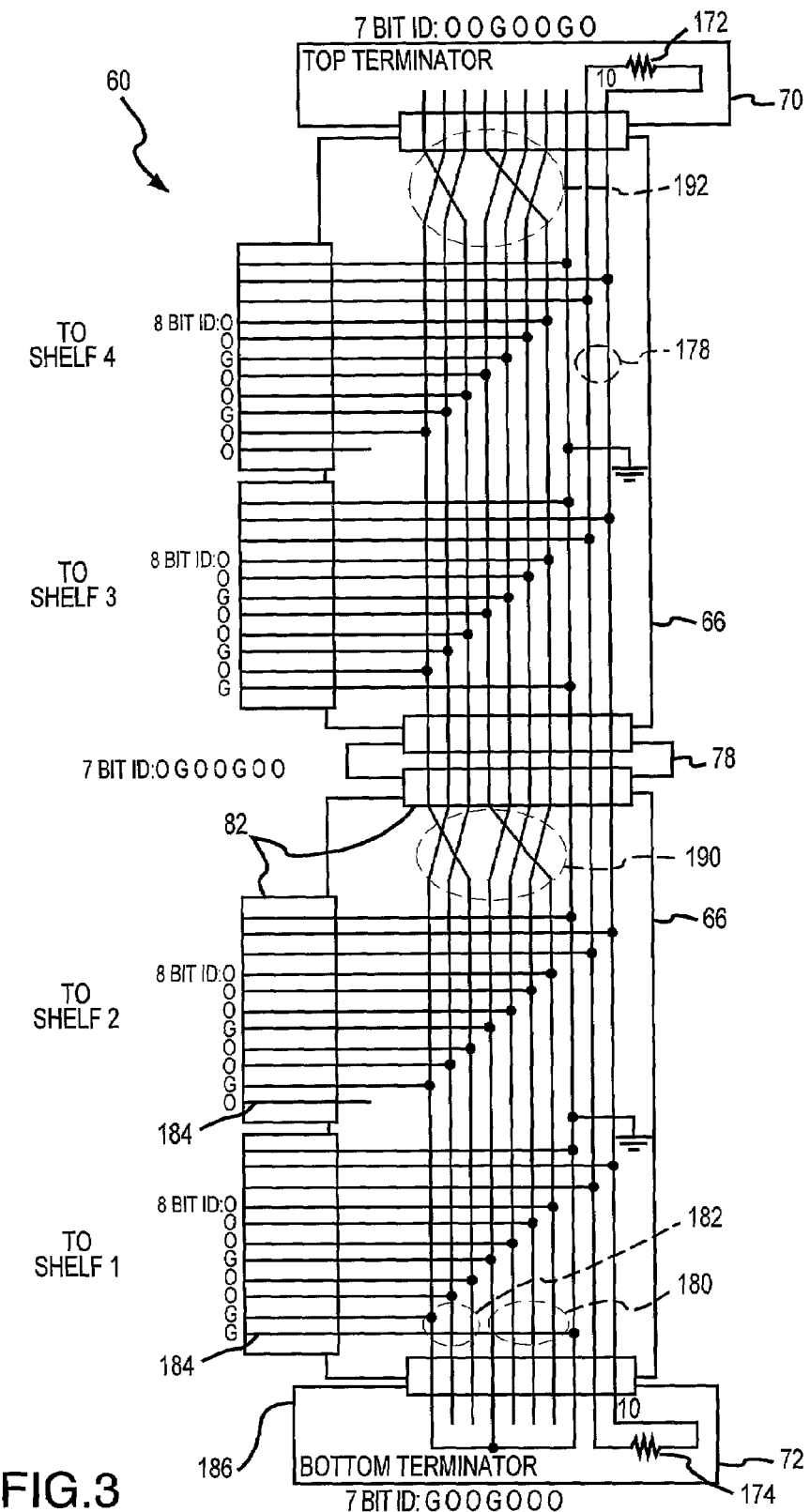
FIG. 3 is a wiring diagram of a portion of a cabinet cable illustrating a 3–4 wiring arrangement used in one embodiment to provide position detection by supplying unique digital identifiers to each shelf location in a cabinet.

FIG. 3 shows one preferred embodiment of a cabinet bus 60 that provides 24 unique shelf identifiers (as shown in tabular form in FIG. 4). A small portion of the cabinet bus 60 is provided illustrating only two junction boxes 66 although the number of junction boxes 66 typically will range between 7 and 12 for most cabinets 20, 50 to identify between 14 and 24 shelves 24, 54. The cabinet bus 60 has two main purposes: provide an identifier for an enclosure 100 location within the cabinet 20, 50 (such as vertical position in distances in units of 3U from the bottom of the cabinet 20, 50 and cabinet designation or identifier) and provide a communications path between the device enclosure EMUs 130 in the cabinet 20, 50 that does not conflict or compete with the data path 108 to drives 116 within the enclosures 100. The combination of the shelf location and cabinet designation provides complete enclosure position information that allows complete mapping or visualization of every enclosure 100 on shelves 24, 54 in the data storage system 10.

In the embodiment illustrated in FIG. 3, a ten-wire arrangement for the cabinet bus 60 is shown with seven wires being dedicated to passively providing the shelf location to the side connectors 82 in which enclosure 100 is connected (such as to EMU 130 via CAN bus controller 156). As shown, two wires are used for a CAN bus 178 and the remaining wire is used as a ground for the cabinet bus 60. The "horizontal" portion of the cabinet bus 60 is a stub that taps off the "vertical" portion at a specific location for a single shelf 24, 54.

The cabinet bus 60 is fabricated of modular pieces called junction boxes 66. Each junction box has four connectors 82, 84, such as RJ-45 connectors. Two connectors 82 (side or transverse connectors) are stubs that connect to two shelves 24, 54 (as shown with connectors 82, 84 to shelf 1 and shelf 2 for one junction box 66 and to shelf 3 and 4 for the second junction box 66). The other two connectors 82, 84 (end or inline connectors) function to enable the junction boxes 66 to be daisy chained to adjacent junction boxes 66 with an inter-junction cable 78, 80. In a typical cabinet 20, 50, each junction box 66 serves 2 shelves (or 6U of height in a 3U spacing arrangement) within the cabinet 20, 50. To facilitate operation of the CAN bus 178, terminating resistors 172, 174 (such as 120 ohm resistors) are provided at each end of the active bus 178. In one embodiment, the terminating resistors 172, 174 are contained in terminating plugs 70, 72 attached to the top and bottom junction boxes 66 in the cabinet bus 60.

The cabinet bus 60 includes a first and second sensing group of wires 180, 182 and a selectively grounded wire 184 that are dedicated to providing shelf identifier or position information to the side connectors 82 (and, connected enclosures 100). As shown, the first and second groups 180, 182 include a total of seven wires with the first group 180 including 4 wires and the second group 182 including 3 wires. At the bottom terminator 174 (in the bottom of the cabinet 20, 50), one wire from each group 180, 182 is grounded and the remaining wires in each group 180, 182 are left open or ungrounded. The signals from each wire in the groups 180, 182 are pulled up (and then combined and processed) in each EMU 130 in the shelves 24, 54 via the side connectors 82. The illustrated embodiment of cabinet bus 60 shows the starting bits (i.e., 7-bit initial ID) of an identifier signal being "OOGOOOG" (for open (O) or a 1 bit and ground (G) or a 0 bit) when the two sensing groups 180, 182 signals are combined sequentially (group 182 followed by group 180).

An eighth sense wire 184 is provided and added to the horizontal stub for each shelf 24, 54 in each junction box 66 (as shown, twice for each box 66). The additional sense wire 184 provides a binary value (or final bit) that is alternately grounded within each junction box 66 to provide a unique shelf identifier (ID) for each shelf 24, 54 within a box 66. As shown, the sense wire 184 is grounded on the first portion of the junction box 66 at 186 prior to tying to the side connector 82 but left open in the second portion of the junction box 66 prior to tying to the second side connector 82. In this example, the first shelf position identifier is the 8-bit ID of "OOOGOOGG" when the first and second sensing groups 180 and 182 are combined with the additional sense wire 184. The second shelf position identifier is differentiated by leaving the sensing wire 184 ungrounded and becomes the 8-bit ID of "OOOGOOGO." In this manner, the passive position sensing method of the present invention is able to uniquely identify each shelf 24, 54 in each junction box 66 although the same signal originates (from the starting 7-bit identifier) in the combination of the two sensing groups 180, 182.

To provide a unique identifier (e.g., 7-bit identifier) to each junction box 66, the passive numbering scheme utilizes numbers of wires for groups 180, 182 that are relatively prime, such as 3 and 4 in the illustrated embodiment. Significantly, the lines within each group 180, 182 are rotated or crossed-over as shown at 190 and 192 after the final side connector and at least before the next connection to the next junction box 66. In other words, each wire in each sensing group 180, 182 is moved one position within the group 180, 182 to present a new position code to the next junction box 66 along the cabinet bus 60 (including a last position to a first position). For example, as shown, the rotation or "next position" moving of the wires in the groups at 190 causes the initial position identifier signal to change from "GOOGOOO" to "OGOOGOO" and at 192 to change from "OGOOGOO" to "OOGOOGO."

In operation, the shelf ID is determined from the combined signals of the eight lines (TTL or other lines) of the first and second sensing groups 180, 182 and the additional sensing line 184 from the cabinet bus 60. The use of groupings of 3 and 4 lines (sets 182, 180) combined with an alternately grounded eighth line 184 provides 24 unique identifiers as shown in the table of FIG. 4. FIG. 4 further shows how for each segment of cable 60 corresponding to a junction box 66 the single binary bit of the alternating grounded wire 184 provides two unique shelf IDs. The larger cabinets 20, 50 generally have heights of less than about 42U, and each storage shelf 24, 54 occupies 3U with a pair of controller shelves/enclosures occupying another 3U of the cabinet height. Hence, typical cabinets 20, 50 contain 14 or less shelves 24, 54 and the 24 shelf IDs provided by the illustrated example is more than adequate.

A shelf ID of "0" is reserved to indicate the actual shelf position cannot be determined. Shelf IDs of 1 to 14 shown in FIG. 4 are used for shelves 24, 54 used for device enclosures 100 and indicate the height the shelf 24, 54 is from the bottom of the cabinet 20, 50. Shelf ID of "15" is reserved for a cabinet EMU with the other shelf IDs being reserved for expansion. As shown in the table of FIG. 4, the position signal provided by the cable 60 can also indicate a cabinet cable 60 is disconnected which occurs whenever every wire in either of the sensing groups 180, 182 is left open or ungrounded.

The enclosure 130 with the CPU 134 can process the received shelf ID signal from the side connector 82 to quickly look up or otherwise determine the shelf ID (which is typically a number of distance unit, such as 3Us, from the bottom of the cabinet 20, 50) and convert this to a four bit shelf ID (i.e., representing shelf IDs of 1 to 14). The cabinet identifier information, such as a cabinet number, from the cabinet EMU 86, 88, is unique number and in some embodiments is a unique 8-bit number. In operation, the EMU 130 operates to transmit the shelf ID and cabinet number in each message, such as in the message header, to allow the receiving device (e.g., the monitoring GUI host 30, 40 or another enclosure 100 in another cabinet 20, 50) to quickly identify and/or map the physical location of the enclosure 100 within the data storage system 10 by shelf 24, 54 and cabinet 20, 50. Of course, if no message is received from an EMU 130, the enclosure 100 is not present or in other words, if a shelf ID and cabinet number combination is not reported to the GUI host 30, 40 then that location would be considered open or available.

Figure 5:
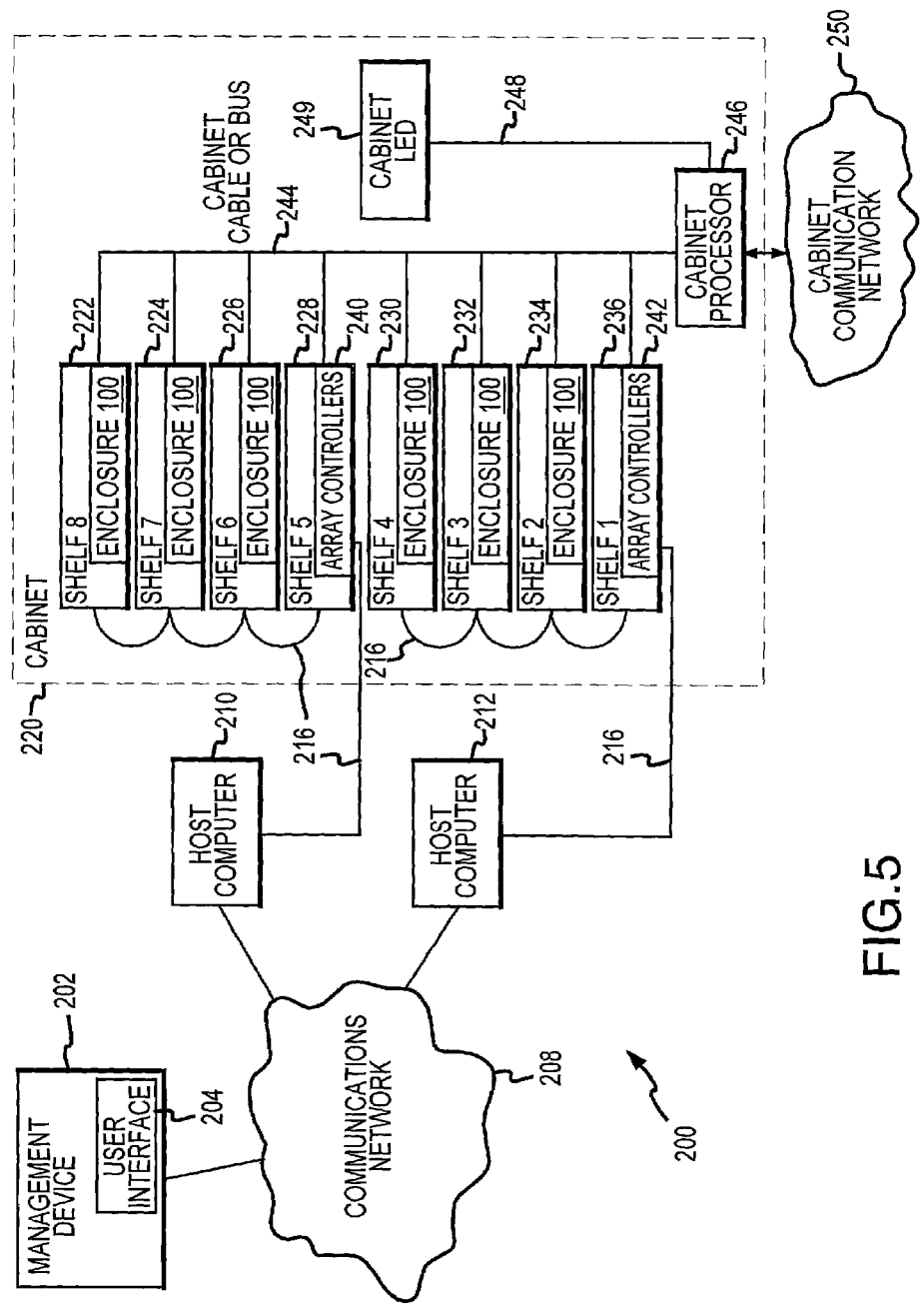
FIG. 5 is another exemplary portion of a mass storage complex illustrating one arrangement of a cabinet with two reporting groups including array controllers and hosts.
Figure 6:
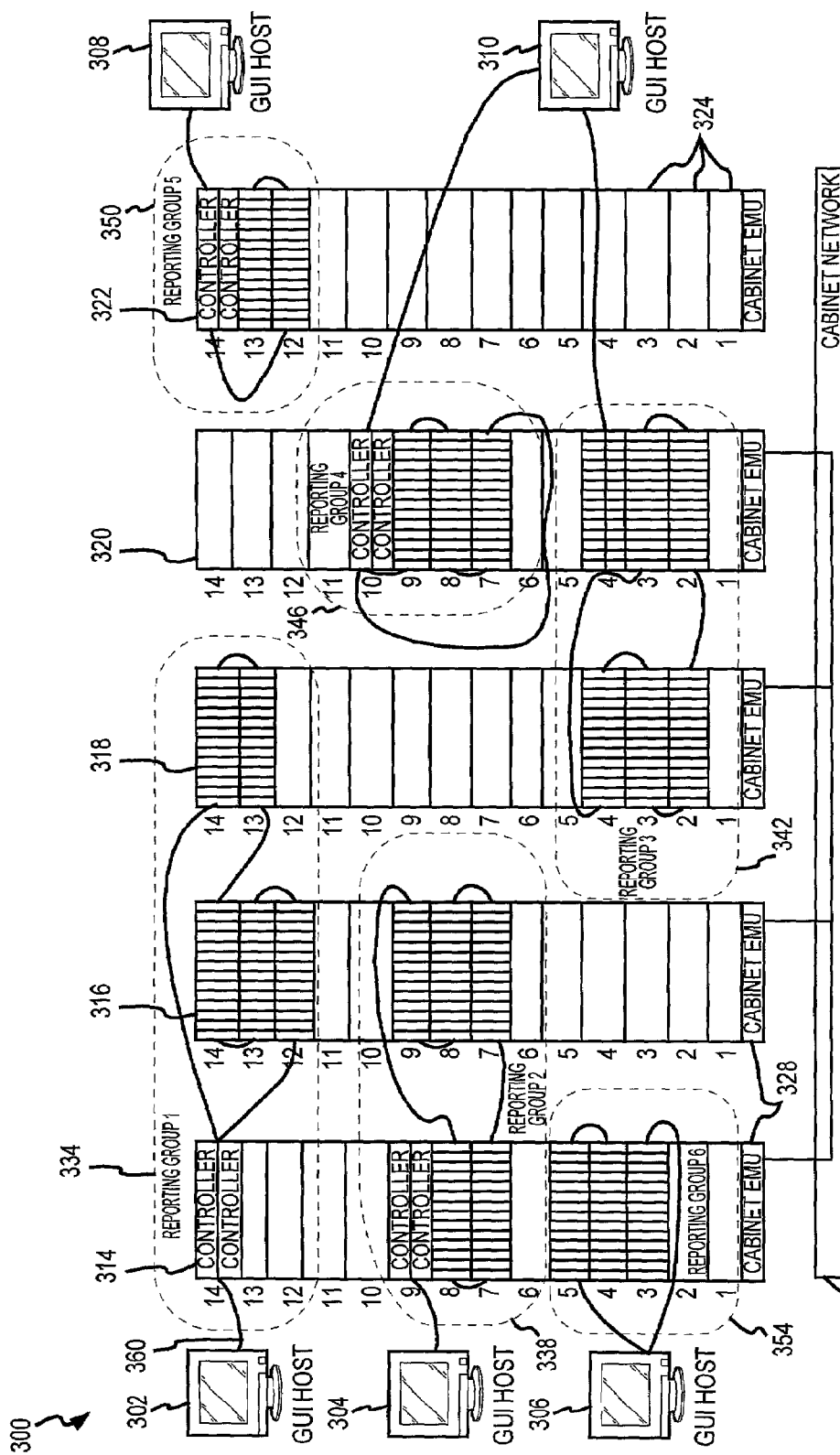
FIG. 6 is mass storage system arranged for unified management (i.e., by any GUI host or single device) illustrating that the present invention supports reporting groups within a single cabinet or spanning two or more cabinets and illustrating the use of cabinet processors or EMUs linked via a cabinet communications network to simultaneously broadcast device and enclosure information throughout the system and among cabinets.
Figure 7:
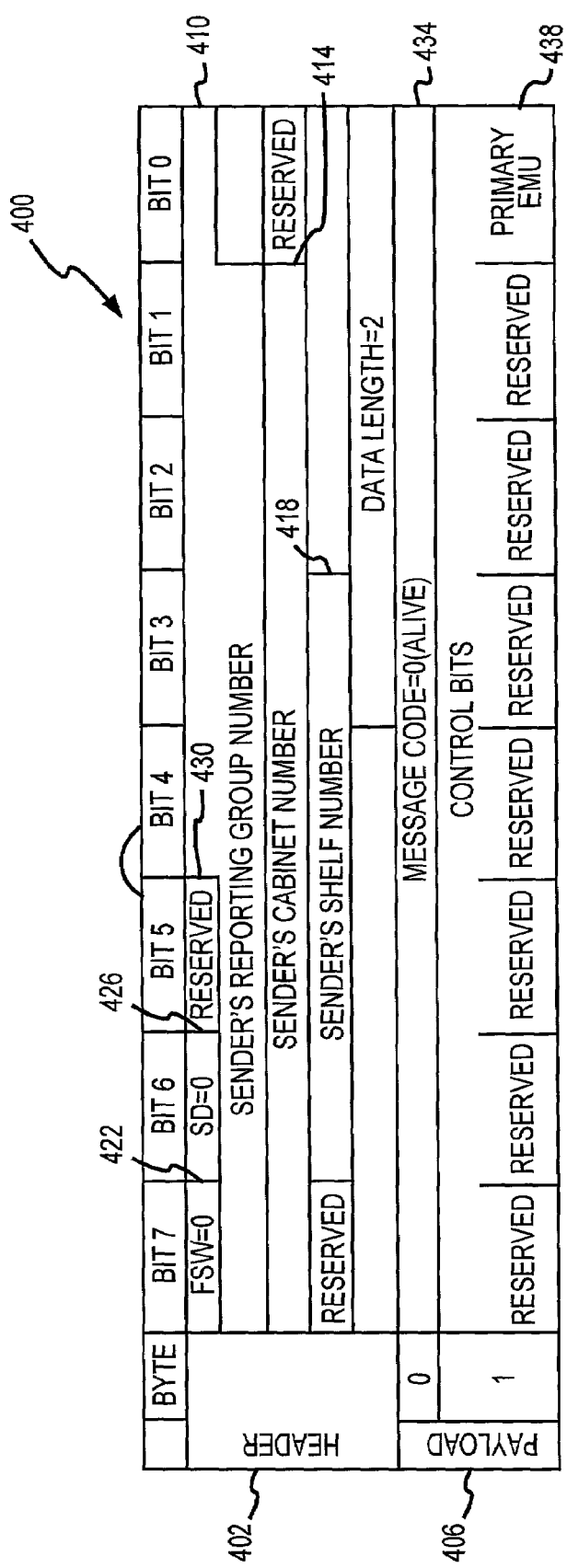
FIG. 7 illustrates one embodiment of a message header for use with the messages broadcast by the enclosure processors or EMUs and/or the cabinet processors or EMUs.

With an understanding of position sensing and of cabinet and enclosure structure, a unified management system and method according to the present invention is provided with reference to FIGS. 5–7. FIG. 5 illustrates a simplified mass storage complex 200 incorporating the unified management features of the invention. The system 200 provides for a single device in the management device 202 that can access and control each of the devices in the system 200. The management device 202, which may be a personal computer, a server, a laptop or handheld or any useful computing or electronic device, includes a user interface 204 (such as a monitor, mouse, keyboard, and GUI) to receive and display information to and from an operator at a single location. The management device 202 is linked to a communications network 208 which may include an Ethernet, an Intranet, the Internet, a LAN, a WAN, or other useful digital data communication network or link. As will become clear, the system 200 includes two reporting groups and as such, includes two host computers 210, 212 linked to and operable by command sets or signals by the management device 202 via the communications network 208. Again, the host computers 210 may be any of a number of useful computing devices, such as a PC, and preferably include a user interface, such as a GUI, for facilitating user operation and display of system information.

The host computers or GUI hosts 210, 212 are in turn communicatively linked to the cabinet or rack 220 and the components positioned therein by data link 216, which in one embodiment includes one or more fibre channel loops. The cabinet 220 shown is a simple configuration useful for explaining several of the important features of the invention. The cabinet 220 includes eight shelves 222, 224, 226, 228, 230, 232, 234, 236 adapted for physically supporting and communicatively linking computing and other devices. As illustrated, six of the shelves 222, 224, 226, 230, 232, 234 hold enclosures 100 (as shown in FIG. 2 or of other configurations) while two shelves 228, 236 hold controllers 240, 242 (such as array controller pairs provided for redundancy in typical RAID cabinets).

An important aspect of the invention is the organizing of system 200 components and communication links into groups called reporting groups. This grouping of the components and communication links facilitates the unified management features of the invention and enables placing of group components (such as device enclosures) in one or more cabinet. The key features of reporting groups is explained fully with reference to FIG. 6. Briefly, however, the system 200 includes two reporting groups which are managed by the management device 202. One reporting group includes the enclosures 100 on shelves 222, 224, and 226 and array controllers 240 on shelf 228 and the second reporting group includes the enclosures 100 on shelves 232, 234, 236 and the array controllers 242 on shelf 236. The fibre channel loops 216 feeding each of shelves in each reporting group are separate. At the level of the fibre channel or communication loop 216, there is no interaction between the enclosures 100 and controllers 240, 242 of the two reporting groups. The controllers 240, 242 are responsible for assignment of the unique reporting group number or identifier to each of the enclosures 100 and in some embodiments, to the EMU 130 in each enclosure 100.

Significantly, all shelves 222, 224, 226, 228, 230, 232, 234, 236 in the cabinet 220 (and any other cabinet included in the system 200) are communicatively linked out-of-band of the data link 216. This may be provided within the cabinet 220 in a variety of ways. For example as illustrated, a cabinet cable or bus 244 is linked to each of the shelves 222, 224, 226, 228, 230, 232, 234, 236 to allow messages to be communicated substantially simultaneously to each of the enclosures 100 and array controllers 240, 242 within a cabinet 220. Concurrent messaging is provided throughout the system 200 by inclusion of cabinet processors 246 linked to the cabinet cable or bus 244 and a cabinet communication network 250, which is a data network, such as an Ethernet, linking all cabinets 220 in the system 200 to each other. As shown, all of the shelves 222, 224, 226, 228, 230, 232, 234, 236 share the cabinet cable 244 and the cabinet processor 246. In one embodiment, the cabinet cable or bus 244 is configured similar to the cable shown in FIGS. 1 and 3 although other bus or link designs may be used to practice the invention and the cabinet processor 246 is configured as an EMU. The cabinet processor 246 further communicates with and operates a cabinet LED (and/or audio device) via link 248 (e.g., an I2C bus).

With this general understanding of the components of the system 200 understood, a discussion of data flow and collection paths, such as environmental reporting, in the system 200 is provided to highlight how unified management is provided in the system 200. Each enclosure 100 continually operates, typically via an included EMU 130, to collect environmental information for the components within the enclosure 100 (or on the shelf 222, 224, 226, 228, 230, 232, 234, 236). The collected information is then broadcast from the enclosures 100 over the cabinet cable or bus 244 to all members of the same reporting group. Each enclosure 100 (via its EMU 130) determines if the broadcast message is for its reporting group and ignores or filters out SES and/or other data originating from enclosures 100 or devices in different reporting groups. The environmental or SES data broadcast in the messages from each reporting group within a cabinet 220 shares the cabinet bus 244 bandwidth with only the other reporting groups within the cabinet 220. Some of this data or these messages may originate from a different cabinet 220 as will become clear from the following description.

According to another important aspect of the invention, any enclosure 100 and enclosure EMU or processor 130 in each reporting group can be accessed directly by the management device 202 via the host computers 210, 212 and array controllers 240, 242 at any time via the fibre channel paths 216. Preferably, within each reporting group, one enclosure 100 or enclosure EMU 130 is assigned to be a primary reporting device (e.g., primary enclosure EMU 130) with the other enclosures 100 or enclosure EMUs 130 being secondary reporting devices. The assignment or selection of the primary reporting device is typically performed by the host computers 210, 212 or array controllers 240, 242 within each reporting group and this selection can be arbitrary. In other words, any of the enclosures may be selected to be the primary reporting device and the designation can be changed during operation of the system 200 to support reconfiguration of the system 200 and/or maintenance.

The primary reporting device is responsible for responding to requests from the management device 202 and/or the host computers 210, 212 (via the user interface software) for environmental and/or other data pertaining to the entire reporting group or a portion of the group. The response from the primary reporting device typically will include data for all components and devices (e.g., for sub-enclosures) on the shelves 222, 224, 226, 228, 230, 232, 234, 236 of the reporting group for which the primary reporting device is assigned and may be formatted to satisfy various reporting and messaging protocols. The data includes the reporting group messages broadcast from each enclosure 100 in the reporting group within or outside the cabinet 220 and over the shared cabinet bus 244. In addition to collecting system data from a single device 202, management or control is achieved from a single management device 202 by issuing control commands to the host computers 210, 212 for a reporting group(s) which communicates the control commands to the primary reporting device (or primary EMU 130). The primary reporting device, in turn, processes the control command and forwards the processed control command to the target enclosure 100 or enclosure EMU 130 over the fibre channel loop 216.

The cabinet processor 246, such as an EMU, functions as a router of broadcast messages and data including environment information (e.g., SES information) and as a firewall for the devices within cabinet 220 linked to the cabinet bus 244. When the enclosures 100 broadcast or transmit messages on the cabinet bus 244, the cabinet processor or EMU 246 determines whether the messages (such as SES data) should be forwarded to other cabinets (not shown) attached to the cabinet communication network 250. In one embodiment, the cabinet processor 246 passes along all messages because reporting groups may span two or more cabinets in the system 200. In another embodiment, the cabinet processor 246 performs a lookup or comparison of the reporting groups within the cabinet 220 to determine if any of the reporting groups span to other cabinets. If yes, the message or a portion of the message on the cabinet bus 244 is broadcast over the cabinet communication network to all cabinets or to the cabinets containing components or shelves within the reporting group. Otherwise, the message is not broadcast outside the cabinet.

In many embodiments, messages are broadcast over the cabinet communication network 250 to all cabinets and the cabinet processor 246 needs to function as a filter or firewall. In these embodiments, the cabinet processor or EMU 246 receives a broadcast or forwarded information, such as SES data. The cabinet processor 246 filters the received message and any information pertaining to reporting groups within the cabinet 220 is rebroadcast or forwarded to the cabinet bus or cable 244. The processors or EMUs 130 of each of the enclosures 100 on the shelves 222, 224, 226, 228, 230, 232, 234, 236 receives the rebroadcast information, determines if the information pertains to its reporting group (filtering out other reporting group information) and if applicable to its reporting group, stores the information (such as in memory 138, 140, 142 and the like). Note, the rebroadcast information appears as if it were transmitted within the cabinet 220 to the enclosure EMU 130. To provide fuller system information to the management device 202, the cabinet EMU 246 preferably creates and broadcasts messages such as SES data for itself as a sub-enclosure or device to the cabinet bus 244. Each enclosure, regardless of reporting group, within the cabinet 220 of the cabinet EMU 246 receives and stores the information and includes it as sub-enclosure information in reports provided by each primary reporting device.

As can be seen from the above description, the inclusion of the cabinet bus 244, its configuration, and the technique of linking it to each enclosure EMU 130 and array controller 240, 242 provides two important functions for the management system. First, the cabinet bus 244 may be configured to provide shelf identifiers as discussed with reference to FIGS. 1–3. Second, the cabinet bus 244 provides a communication path between the enclosure EMUs or processors 130 that is different from and does not conflict or compete for bandwidth with the data path 216 to the enclosure drives 116. For example, the controller area network (CAN) bus portion of the cabinet bus 244 may be used for these behind the disk device communications. The use of the bus 244 provides an "out-of-band" communication path that facilitates ongoing broadcasting of environmental and other information in messages throughout the system 200 and significantly, among all members of reporting groups whether the members or devices are in one or more cabinets 220 in the system 200. For the management system, the specific configuration of the cabinet bus 244 is not as important as its inclusion and its connection to each of the shelves within each cabinet 220 in the system 220.

The system 200 illustrated in FIG. 5 was useful for explaining data flow and connections within a cabinet 220. Referring now to FIG. 6, a multi-cabinet mass storage system 300 is provided to more fully explain the reporting group concept of the invention. As shown, five GUI hosts 302, 304, 306, 308, 310 are provided to communicate with a centralized management device (not shown but similar to the device 202 of FIG. 5) and to provide an access point to reporting groups and typically to controllers in each reporting group. The mass storage system 300 includes five cabinets or rack devices 314, 316, 318, 320, and 322 each having a plurality of shelves 324 for holding and linking computing devices such as controllers (e.g., array controller pairs), device enclosures, and the like. The cabinets 314, 316, 318, 320, and 322 are each shown to have 14 shelves but the invention is useful in systems 300 having greater or fewer cabinets, with cabinets having greater or fewer shelves, and with systems 300 mixing cabinets with differing numbers of shelves and components on such shelves.

Cabinet processors, such as EMUs, 328 are provided in cabinets 314, 316, 318, and 320 to function as filtering devices and reporting group message routers (as described for processor 246 of FIG. 5). The cabinet processors 328 are linked to the cabinet network 330, such as an I2C bus, an Ethernet, a LAN, a WAN, or other network or communication bus, to provide a data flow path among reporting groups in different cabinets. A data path is provided between the GUI hosts 302, 304, 306, 308, 310 (such as computing devices running user interface and system monitoring software applications) and devices in the cabinets 314, 316, 318, 320, 322 by data links 360 (e.g., fibre channel loops).

As discussed previously, the unified management features of the present invention are useful for providing single access points to data storage complexes, such as complex 300, and for facilitating sharing components, such as device enclosures and controllers, located in one or more cabinet 314, 316, 318, 320, 322. To explain these features, the mass storage complex 300 is shown to have six reporting groups 334, 338, 342, 346, 350, 354 that are each configured differently to illustrate the flexibility provided with the use of reporting group arrangements and complex-wide message broadcasting or environmental/data reporting.

The first reporting group 1 is shown to include controllers on a shelf 324 of one cabinet 314 and device enclosures or data storage devices on shelves 324 of two other cabinets 316 and 318. The GUI host 302 is linked to the controllers in cabinet 314 and the controllers and device enclosure are linked by data paths 360. For the controller in cabinet 314 to be able to report environmental data for all of the storage devices in the first reporting group 334 to the GUI host 302, the controllers need to communicate with five storage devices in two different cabinets from the cabinet 314 in which it resides. This is achieved by the controller assigning one of the enclosures as the primary reporting device. For example, the enclosure processor or EMU of the enclosure on the twelfth shelf of cabinet 316 may be informed that it is the primary reporting device and is responsible for collecting environmental and/or other information from the other storage devices in the reporting group 334. As discussed, any enclosure or storage device may be designated as primary reporting device, which allows devices to be replaced and assigned to different reporting groups.

As shown in FIGS. 2 and 5, the processors or enclosure EMUs 130 of the enclosures 100 are not directly the data path 360, e.g., fibre channel loops, which prevents the enclosure EMUs 130 from determining which array or data loop 260 they are connected to. The assignment of the enclosures to the reporting group 334, such as by assigning each of the five data storage devices in cabinets 316 and 318 an identical reporting group number or identifier (ID). Using the reporting group ID as an address, the two storage devices in cabinet 318 in reporting group 334 broadcast their environmental data or other information in a reporting message. The message is sent via a cabinet bus (such as cable 244 of FIG. 5) to the cabinet EMU 328 which transmits the message over the cabinet network 330 (which connects all cabinets 314, 316, 318, 320, 322 in the mass storage complex 300) to the cabinet EMU 328 in cabinet 316 (and in many embodiments, to all cabinets connected to the network 330).

This cabinet EMU 328 determines if the message is for a reporting group within the cabinet 316 and if so, rebroadcasts the message on the cabinet cable or bus 244 of cabinet 316. The devices in reporting group 338 do not accept or ignore the message as not having their reporting group ID. The secondary devices in reporting group 334 in cabinets 316, 318 accept and store the information while the primary device on the twelfth shelf 324 of cabinet 316 accepts and stores the message. In a preferred embodiment, the primary reporting device via its EMU 130 typically will process the message to place all of the included environmental data into a message form dictated by reporting specifications and/or protocols (such as SES pages required by SES specifications) and then transfers these pages to the controller in cabinet 314 via the data path 360. These pages may be transferred on an ongoing basis as data is received from devices in the reporting group, on a predetermined periodic basis, and in response to requests from the controller or GUI host 302.

The mass storage complex 300 further includes a second reporting group 338 which is similar to the first reporting group 334 except that it only spans between cabinets 314 and 316. The second reporting group 338 is in communication with GUI host 304 via data path 360 attached to controllers in the ninth shelf of cabinet 314. Cabinet 314 includes two device enclosures on the seventh and eighth shelves 324 and cabinet 316 includes three device enclosures on the seventh, eighth, and ninth shelves 324 of cabinet 316. Any of the enclosure devices may be assigned to be the primary reporting device and the controller would receive consolidated pages containing environmental data from that primary reporting device, which gathers the information from messages broadcast on the cabinet cables of cabinets 314, 316 and the cabinet network 330. The third reporting group 342 of the complex 300 includes similar components as the second reporting group 338 but these components are located cabinets 318, 320 and are accessed and monitored via GUI host 310.

Although the management system and out-of-band communication path features of the invention are particularly useful in sharing devices among cabinets, the fourth reporting group 346 illustrates that all the devices of a particular group may be located within a single cabinet (such as cabinet 320). Within reporting group 346 a primary reporting device would still be designated by the controllers in the tenth shelf 324, messages would still be broadcast by the enclosure devices onto a cabinet cable (such as cable or bus 244 shown in FIG. 5) and the cabinet EMU 328 of cabinet 320 would (in most embodiments) broadcast the messages onto the cabinet network 330. The cabinet EMUs 328 in the other cabinets 314, 316, and 318 would filter or block the messages though as not being applicable to reporting groups residing within their cabinets.

GUI host 310 is linked to the fourth reporting group 346 as well as reporting group 342. This illustrates that a single host device may be attached to more than one communication loop or data path 360 to enable a single device to manage more than one reporting group. Single device management may further be achieved by two or more of the GUI hosts 302, 304, 306, 308, 310 to a management tool (such as management device 202 of FIG. 5). Even with the use of a single host or management device, each reporting group 342, 346 requires assignment and retention of a primary reporting device to collect environmental information and to allow reporting group specific control commands to be directed to each reporting group (as these commands are processed and routed by the primary reporting device).

The fifth reporting group 350 of the complex 300 is illustrated to be positioned within a cabinet 322 that does not have a cabinet EMU 328 or a connection to the cabinet network 330. Without these components, the fifth reporting group 350 cannot be expanded to the other cabinets 314, 316, 318, 320 to share other complex 300 components. However, a primary reporting device is still assigned and messages are broadcast on the cabinet bus of cabinet 322 for receipt and collection by the primary reporting device. The primary reporting device passes this information to the controllers in the fourteenth shelf 324 of cabinet 322 for transmission via loop 360 to GUI host 308.

The sixth reporting group 354 is provided to illustrate that controllers such as array controllers are not required to practice the management method of the present invention. The enclosures or storage devices in reporting group 354 are under the direct control of the GUI host 306 (which is often the case for non-RAID devices, such as JBOD (Just a Bunch of Disks) devices and shelves). A primary reporting device would be assigned by the GUI host 306 and messages would be broadcast by the devices in the reporting group 354 within the cabinet 314 (and not over the network 330 if the cabinet EMU 328 acts as a filter for outgoing messages by only transmitting messages outside cabinet 314 for reporting groups having member or devices outside cabinet 314).

With further reference to the enclosure 100 of FIG. 2 and the storage system 200 of FIG. 5, the environmental reporting and system-wide concurrent broadcasting features (and messaging protocols) of the invention are more fully described. As previously discussed, the cabinet cable or bus 244 and cabinet communication network 250 combine to allow effective, out-of-band transfer of environmental and other data between enclosure processors or EMUs 130. The data is preferably formatted to an industry expected and accepted standard, such as, but not limited to, the "SCSI-3 Enclosure Services Command Set (SES)" specification. Whichever data formatting standard is used, it is preferable that the system 200 be able to support all or most of the defined formats or pages. In one embodiment, all pages defined under SES are supported by the system 200. This embodiment specifically uses the following SES pages: Supported Diagnostics ("0"); Configuration ("1"); Status and Control ("2"); Help Text ("3"); String In and Out ("4"); Threshold In and Out ("5"); Enclosure Descriptor ("7"); and Short Status ("8"). Preferably, each device that is included within a reporting group supports these pages with support of the Configuration and Status and Control pages being a minimum requirement for inclusion in a reporting group.

At system 200 (or 300) start up, each enclosure EMU 130 and cabinet EMU 246 on the cabinet bus 244 sends a copy of a set of its data pages (such as all of its environmental pages except the Supported Diagnostics) onto the bus 244. In steady state operations, each enclosure EMU 130 and cabinet EMU 246 typically sends an update when a particular page significantly changes, with a "significant change" being defined by the sending device (e.g., such a change may include all changes in current, voltage, and temperature other above a set threshold) or in some embodiments, the pages are resent periodically whether or not a change has occurred.

All environmental data pages for each reporting group are gathered by the assigned or designated primary reporting device (e.g., by the EMU 130 of such enclosure 100). All commands (e.g., Control, String In and Out, and Threshold In and Out pages) are sent to the primary reporting device (e.g., to the EMU 130 of the enclosure 100 acting as the primary device) by a host 210, 212 directly or via a controller 240, 242. The primary EMU 130 then parses the command data and forwards the appropriate portion to the secondary devices within the same reporting group (to the EMUs 130 of these enclosures 100) over the cabinet bus 244 and, if necessary, over the cabinet communication network 250.

Depending on data formatting specification being implemented within the system 200, the EMU 130 of the primary reporting device or enclosure 100 preferably performs some processing of the commands prior to transmitting the command pages or messages over the cabinet bus 244. For example, in an SES embodiment, the primary EMU 130 may be configured to process a Control page by breaking or dividing it into smaller Control pages or sub-pages. Such a division may be performed based on the sub-enclosure identification of each element in the combined Configuration page. Each sub-page is then sent only to the appropriate or indicated secondary devices via the cabinet bus 244 and/or cabinet communication network 250. The EMUs 130 of the secondary devices or enclosures 100 in turn perform a screening process to determine if the page identifies the proper reporting group and sub-enclosure (device) and in some cases, to complete a consistency check of the particular command to verify the command is an appropriate command for the devices within the enclosure 100.

The messages broadcast from each device in a reporting group and other sub-enclosures linked to cabinet cables 244 (such as cabinet EMUs 88, 246) may take a number of forms and include a variety of information. Preferably, each broadcast message includes at least the sending (or receiving for forwarding and control command messages) device's reporting group ID to allow a primary device to determine whether or not to collect the information and in many preferred embodiments the cabinet ID, and shelf identifier and/or location.

FIG. 7 illustrates one exemplary message 400 that may be broadcast by an EMU 130 of an enclosure 100, by a cabinet EMU 88, 246, or other device according to the management system of the invention. As shown, the message includes a header 402 and a payload 406 (e.g., a message content portion). The size in bits provided for each portion of the header 402 will typically vary depending on the CAN bus controller 156 or interface chip utilized in the enclosure processor 130 and cabinet processor 88, 246. For example, the illustrated extended message header provides 29 bits of header information and up to 8 bytes of data payload 406 per packet or message 400 (as is provided by the Philips SJA1000 Standalone CAN Controller). This has proven to be a useful message 400 arrangement but many other embodiments will be apparent to those skilled in the arts and are considered to be within the breadth of this disclosure and the following claims.

As illustrated, the header 402 includes the sender's reporting group ID or number 410 that allows a primary and secondary reporting devices to quickly determine if the message 400 on the cabinet bus 244 should be collected, processed, and stored or simply ignored (by a comparison with a reporting group ID in enclosure processor 130 memory). The reporting group ID (and grouping enclosures and devices in reporting groups) allows unitized storage system management and reduces the memory requirements for the enclosure EMUs 130 and CAN bus controllers 156. The illustrated message 400 shows the use of 12 of the header bits for the reporting group ID 410. These can be bits 1 to 7 of byte 1 and bits 0 to 4 of byte 0 (or other bytes). The CAN bus controller 156 acts as the filter for the EMU 130 by setting one of its acceptance filters to trigger on any message 400 that includes a value in the reporting group ID 410 portion of the message 400 that matches the receiving enclosure or node reporting group ID. If a match occurs, at least SES information in the payload 406 is accepted and stored by each enclosure EMU 130 (to allow any device to be the primary reporting device). Typically, a predetermined number or ID, such as "0", is reserved for the cabinet EMUs 88, 246 (which can be thought of as virtual members to all reporting groups within the same cabinet).

The message header 402 also includes the sender's cabinet identifier, e.g., number ID, 414. In the illustrated embodiment or messaging protocol the cabinet ID is 8 bits (bits 1 to 7 of byte 2 and bit 0 of byte 1). In one preferred embodiment, each cabinet EMU 88, 246 is configured with a unique 8 bit cabinet ID number and the ID number is available to all devices on the shelves of the cabinet linked to the cabinet bus 244. Each device or enclosure 100 stores this cabinet ID in memory and then uses this value in all messages 400 it sends. When no cabinet EMU 88, 246 is provided a zero value is used in messages 400.

The message header 402 further includes the sender's shelf identifier or location 418 which provides it position within the cabinet indicated by the cabinet ID 414. As illustrated, the shelf ID 418 is 4 bits (bits 3 to 6 of byte 3). In the positioning scheme presented in this disclosure, the shelf ID is a number (typically ranging from 1 to 14 or 1 to 24 or higher) that represents a number of distance increments, such as 3U, from the bottom of the cabinet. A shelf ID of zero is used if the position is not known or determined at the time the message 400 is to be sent. As can be appreciated, the inclusion of the cabinet number 414 and the shelf ID 418 provides a specific location of the reporting device within the storage complex 200, 300.

In addition to these components of the header 402, a format switch bit (FSW) 422 may be provided in the header 402 to indicate the format of the following message payload 406. For example, the bit may be set (at 1) when the payload 406 includes environmental information such as SES data used by primary EMUs 130 to provide sub-enclosure reporting to the controller 240, 242 or host 210, 212. Otherwise, the message payload 406 is a background message that is not always needed in reporting. A send diagnostic bit (SD) 426 may be provided to allow a primary EMU 130 to send SES Send Diagnostic pages to single enclosures 100 within a reporting group. Receive Diagnostic pages are typically sent to all enclosures 100 within a reporting group, but the send diagnostic bit 426 is set when the SES data in the payload 406 is part of a send diagnostic page. Additionally, reserved bits 430 are preferably provided to allow expansion of the unified management system.

The message payload 406 may also take a variety of forms and the form shown is provided for illustration only not as a limitation. The payload 406 shown includes a message code section 434 that indicates the form and type of following data in the data section 438. This facilitates correct and more efficient message 400 processing by the enclosure EMU 130.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A device for positioning on a shelf of a multi-cabinet data storage cabinet in a mass storage system, comprising:
   a first interface providing a communication link with a data path to a control device external to the device;
   a second interface providing a communication link with a cabinet bus contained in the cabinet; and
   a processor for creating and at least periodically broadcasting environmental messages comprising status information for the device over the cabinet bus via the second interface and for collecting environmental messages broadcast by other ones of the devices over the cabinet bus and providing at least a portion the collected environmental messages to the control device over the communication link via the first interface.

2. The device of claim 1, further including memory storing a reporting group identifier indicating a reporting group assignment for the device, wherein the second interface is adapted to determine ones of the environmental messages broadcast on the cabinet bus broadcast by other devices in the assigned reporting group and to transmit the determined ones to the processor.

3. The apparatus of claim 2, wherein the environmental messages broadcast by the processor include the reporting group identifier.

4. The apparatus of claim 2, wherein the environmental messages broadcast by the processor include an identifier for the cabinet and physical location information for the shelf in the cabinet.

5. The apparatus of claim 4, wherein the communication link comprises a fibre channel loop.

6. The apparatus of claim 5, wherein the device is an array controller.

7. The apparatus of claim 1, wherein the device is positioned outside the cabinet.

8. The apparatus of claim 1, wherein the broadcast environmental messages comprise SCSI-3 Enclosure (SES) data.

9. A mass storage system for providing unified system management, comprising:
   a first reporting group comprising an enclosure having an enclosure processor for generating and transmitting an environmental message for the first reporting group enclosure;
   a second reporting group comprising an enclosure having an enclosure processor for generating and transmitting an environmental message for the second reporting group enclosure; and
   a bus communicatively linked to the first reporting group enclosure and to the second reporting group enclosure for carrying the environmental messages, wherein the environmental messages includes information for identifying whether the environmental message was sent from an enclosure in the first or second reporting group and information for identifying a physical location of the sending enclosure.

10. The system of claim 9, further including a cabinet having shelves for positioning the enclosures of the first and second reporting groups and for housing the bus.

11. The system of claim 10, further including an additional cabinet comprising shelves for positioning an additional enclosure of the first or the second reporting group and an additional bus linked to the additional enclosure for carrying environmental messages to and from the additional enclosure to and from the enclosures in the other cabinet.

12. The system of claim 11, further including a cabinet communication network linked to each of the cabinets for transmitting the environmental messages between the cabinets.

13. The system of claim 11, wherein each of the cabinets includes a cabinet processor linked to the cabinet communication network and the busses adapted to receive the environmental messages, to determine based on the reporting group identifying information whether the enclosures in the particular cabinet are in a matching reporting group, and if a match is determined, transmitting the received environmental message on the bus.

14. The system of claim 9, wherein the enclosure processors are further adapted to receive ones of the environmental messages on the linked bus and to store in memory the received ones determined based on the reporting group identifying information to have been sent from the reporting group to which they belong.

15. The system of claim 9, further including a first data loop linked to the first reporting group and a second data loop linked to the second reporting group, wherein the enclosure processors are configured for transmitting environmental data for the first and second reporting groups, respectively, and to receive command data over the first and second data loops, respectively.

16. The system of claim 15, wherein a host device is linked to the first and second data loops for receiving the environmental data and for providing the command data.

17. The system of claim 15, wherein a first host device is linked to the first data loop for receiving the environmental data from the first reporting group and for providing the command data to the first reporting group and a second host device is linked to the second data loop for receiving the environmental data from the second reporting group and for providing the command data to the second reporting group.

18. The system of claim 17, wherein a management tool is linked to the first and second host devices for receiving the environmental data from the first and second reporting groups and for providing the command data to the first and second reporting groups.

19. A data storage system, comprising:
   a plurality of cabinets each having a plurality of shelves for receiving and linking computing devices and a cabinet bus linked to the shelves for communicatively linking computing devices inserted in the shelves;
   a first set of enclosure devices assigned to a first reporting group positioned on the shelves in the cabinets and linked to at least one of the cabinet busses; and
   a second set of enclosure devices assigned to a second reporting group positioned on the shelves in the cabinets and linked to at least one of the cabinet busses;
   wherein each of the enclosure devices in the first and second reporting group includes an enclosure processor adapted for transmitting an enclosure environmental message over the linked cabinet bus.

20. The system of claim 19, wherein the environmental messages from the enclosure devices in the first and second reporting groups are transmitted substantially concurrently.

21. The system of claim 19, wherein at least one of the enclosure devices in the first reporting group and at least one of the enclosure devices in the second reporting group are located in one of the cabinets.

22. The system of claim 19, wherein a first subset of the enclosure devices in the first set are positioned in a first one of the cabinets and a second subset of the enclosure devices in the first set are positioned in a second one of the cabinets.

23. The system of claim 19, further including a first data loop communicatively linking each of the enclosure devices in the first reporting group and a second data loop communicatively linking each of the enclosure devices in the second reporting group, wherein the first and second data loops are distinct data paths from each other and from the cabinet busses.

24. The system of claim 23, further including a first host device linked to the first data loop and a second host device linked to the second data loop for communicating command sets to each of the reporting groups and monitoring each of the reporting groups.

25. The system of claim 23, further including a host device linked to the first and second data loops for monitoring and controlling the first and second reporting groups with command sets transmitted over the first and second data loops.

26. The system of claim 19, further including a cabinet network linked to each of the cabinets for transferring the environmental messages between cabinet busses in differing ones of the cabinets.

27. The system of claim 26, wherein the enclosure environmental messages include information identifying for a sending one of the enclosure devices an assigned reporting group, one of the cabinets housing the sending enclosure device, and one of the shelves containing the sending enclosure device.

28. The system of claim 26, further including cabinet processors between the cabinet network and each of the cabinet busses, wherein the cabinet processors broadcast on the adjacent cabinet bus ones of the environmental messages on the cabinet network based on the assigned reporting group information relating to ones of the reporting groups housed in the cabinet linked to the particular cabinet processor.

29. The system of claim 26, wherein the enclosure processors are adapted to monitor the enclosure environmental messages on the linked cabinet bus and to store environmental information from ones of the messages which the assigned reporting group matches their reporting group.

30. The system of claim 19, wherein one of the enclosure devices in each of the first and second reporting groups is designated as a primary reporting device, the primary reporting device being configured to receive command sets from control devices via a data path, to transfer the command sets to other ones of the enclosure devices identified in the command sets, and to provide collected environmental information to the control devices via the data path.

* * * * *